United States Patent
Fujimaki et al.

(10) Patent No.: US 10,558,888 B2
(45) Date of Patent: Feb. 11, 2020

(54) REGION LINEAR MODEL OPTIMIZATION SYSTEM, METHOD AND PROGRAM

(71) Applicant: NEC CORPORATION, Tokyo (JP)

(72) Inventors: Ryohei Fujimaki, Tokyo (JP); Hidekazu Oiwa, Tokyo (JP)

(73) Assignee: NEC Corporation, Tokyo (JP)

( * ) Notice: Subject to any disclaimer, the term of this patent is extended or adjusted under 35 U.S.C. 154(b) by 126 days.

(21) Appl. No.: 15/731,172

(22) PCT Filed: Oct. 16, 2015

(86) PCT No.: PCT/JP2015/005243
§ 371 (c)(1),
(2) Date: Apr. 27, 2017

(87) PCT Pub. No.: WO2016/067548
PCT Pub. Date: May 6, 2016

(65) Prior Publication Data
US 2018/0349738 A1 Dec. 6, 2018

Related U.S. Application Data

(60) Provisional application No. 62/069,381, filed on Oct. 28, 2014.

(51) Int. Cl.
G06F 16/00 (2019.01)
G06K 9/62 (2006.01)
G06F 17/18 (2006.01)

(52) U.S. Cl.
CPC .......... *G06K 9/6219* (2013.01); *G06F 17/18* (2013.01); *G06K 9/6226* (2013.01)

(58) Field of Classification Search
CPC ....... G06F 17/12; G06F 17/18; G06K 9/6261; G06K 9/6219; G06K 9/6226
See application file for complete search history.

(56) References Cited

U.S. PATENT DOCUMENTS

| | | | |
|---|---|---|---|
| 6,850,806 B2 * | 2/2005 | Yutkowitz | G05B 11/28 700/37 |
| 2006/0015302 A1 * | 1/2006 | Fang | G06F 17/5022 703/2 |

(Continued)

FOREIGN PATENT DOCUMENTS

| | | |
|---|---|---|
| CN | 103559294 A1 | 2/2014 |
| JP | 2006-155557 | 6/2006 |
| JP | 2012-137813 | 7/2012 |

OTHER PUBLICATIONS

J. Wang et al., "Local Supervised Learning through Space Partitioning", In NIPS, pp. 1-9, 2012.

(Continued)

*Primary Examiner* — Merilyn P Nguyen
(74) *Attorney, Agent, or Firm* — Finnegan, Henderson, Farabow, Garrett & Dunner, L.L.P.

(57) ABSTRACT

A region linear model optimization system optimizes a region linear model, and includes: a linear model setting unit 81 for setting for a partition a linear model to be applied to one of regions representing subspaces divided by the partition, the partition being an indicator function dividing an input space into two portions; and a region model calculation unit 82 for representing a model of each of the regions in the region linear model as a linear combination of the linear models to be applied to the respective regions.

8 Claims, 12 Drawing Sheets

(56) References Cited

U.S. PATENT DOCUMENTS

| | | | | |
|---|---|---|---|---|
| 2009/0292511 A1* | 11/2009 | Vrancic | ............... | G06F 17/12 |
| | | | | 703/2 |
| 2012/0323834 A1 | 12/2012 | Fujimaki | | |
| 2013/0132311 A1* | 5/2013 | Liu | ............... | G06K 9/00718 |
| | | | | 706/12 |
| 2014/0143194 A1* | 5/2014 | Yoon | ............... | G06N 3/08 |
| | | | | 706/25 |

OTHER PUBLICATIONS

International Search Report and Written Opinion of ISA dated Jan. 19, 2016, in corresponding PCT International Application.
Henrik Ohlasson et al., "Identification of Placewise Affine Systems Using Sum-of-Norms Regularization", Proceedings of the 18$^{th}$ World Congress, The International Federatuion of Automatic Control, Milano, Italy, Aug. 28-Sep. 2, 2011, pp. 6640-6645.
Hidekazu Oiwa et al., "Partition-wise Linear Models", arXiv:1410.8675v1 [stat.ML], Oct. 31, 2014.
Laurent Bako, "Identification of Switched Linear Systems via Sparse Optimization", Automatica 47 (2011), pp. 668-677.
Extended European Search Report dated Jun. 27, 2018, issued by the European Patent Office in counterpart European Patent Application No. 15853680.5.

\* cited by examiner

REGION LINEAR MODEL OPTIMIZATION SYSTEM, METHOD AND PROGRAM

CROSS-REFERENCE TO RELATED PATENT APPLICATIONS

This application is a National Stage Entry of International Application No. PCT/JP2015/005243, filed Oct. 16, 2015, which claims priority from U.S. Provisional Application No. 62/069,381, filed Oct. 28, 2014. The entire contents of the above-referenced applications are expressly incorporated herein by reference.

TECHNICAL FIELD

The present invention relates to a region linear model optimization system for optimizing a region linear model, a region linear model optimization method, and a region linear model optimization program.

BACKGROUND ART

A region linear model is widely used for an actual device as a model representation with high interpretability. In such a model, an input space is divided into several subspaces (hereinafter, also described as regions), and then a simple model is set for each region. In this way, the model with a structure using regions has excellent prediction performance even for non-linearity due to a plurality of partitions, and interpretation of data is also easy.

As a model dividing the region, a decision tree model and a model described in NPL 1 have been known. NPL 1 describes a method for adaptively dividing a feature space into different multiple regions and learning a prediction model of each region. Each model optimizes an objective function for the prediction model in region division and each divided region.

CITATION LIST

Non Patent Literature

NPL 1: Joseph Wang and Venkatesh Saligrama, "Local supervised learning through space partitioning.", In NIPS, pp. 91-99, 2012.

SUMMARY OF INVENTION

Technical Problem

Since division of the region and optimization of the prediction model of individual divided regions are interdependent, a problem of learning the region linear model such as the decision tree model and the model described in NPL 1 comes down to a non-convex problem. For that reason, in a case of optimization of such a non-convex problem, problems occur such as a problem of initial value dependence, or that it is impossible to sufficiently analyze the generalization error.

Therefore, an object of the present invention is to provide a region linear model optimization system, a region linear model optimization method, and a region linear model optimization program capable of avoiding the non-convex problem and generating an optimal region linear model.

Solution to Problem

A region linear model optimization system according to the present invention is a region linear model optimization system for optimizing a region linear model, the region linear model optimization system including: a linear model setting unit which sets for a partition a linear model to be applied to one of regions representing subspaces divided by the partition, the partition being an indicator function dividing an input space into two portions; and a region model calculation unit which represents a model of each of the regions in the region linear model as a linear combination of the linear models to be applied to the respective regions.

A region linear model optimization method according to the present invention is a region linear model optimization method for optimizing a region linear model, the region linear model optimization method including: setting for a partition a linear model to be applied to one of regions representing subspaces divided by the partition, the partition being an indicator function dividing an input space into two portions; and representing a model of each of the regions in the region linear model as a linear combination of the linear models to be applied to the respective regions.

A region linear model optimization program according to the present invention is a region linear model optimization program to be applied to a computer for optimizing a region linear model, the region linear model optimization program causing the computer to execute: linear model setting processing for setting for a partition a linear model to be applied to one of regions representing subspaces divided by the partition, the partition being an indicator function dividing an input space into two portions; and region model calculation processing for representing a model of each of the regions in the region linear model as a linear combination of the linear models to be applied to the respective regions.

Advantageous Effects of Invention

According to the present invention, a non-convex problem can be avoided and an optimal region linear model can be generated.

DESCRIPTION OF EMBODIMENTS

Hereinafter, exemplary embodiments of the present invention will be described with reference to the drawings.

First Exemplary Embodiment

Figure 1:
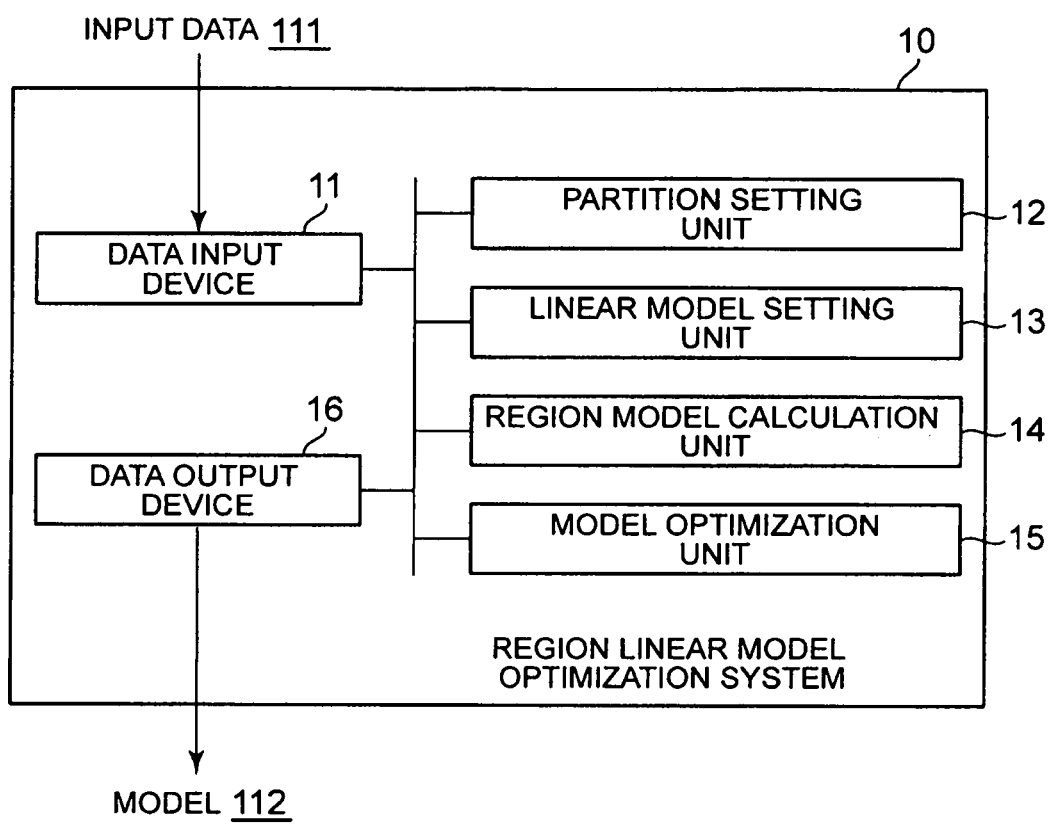
FIG. 1 It depicts a block diagram illustrating a configuration example of a first exemplary embodiment of a region linear model optimization system according to the present invention.

FIG. 1 is a block diagram illustrating a configuration example of a first exemplary embodiment of a region linear model optimization system according to the present invention. When input data 111 is input, a region linear model optimization system 10 of the present exemplary embodiment optimizes a region linear model for the input data 111, and outputs a model 112 optimized.

First, an outline will be described of a model used in the present invention. In the present invention, as new type of the region linear models, linear models according to a partition method (partition-wise linear models. Hereinafter, described as the present linear models) are used.

The present linear models divide a space (hereinafter, described as an input space) in which data exists, by using a set of partitions. The partitions correspond to indicator functions each dividing the input space into two portions. In addition, in the description below, a subspace obtained by dividing the input space is described as a region. In the present invention, it is assumed that each region does not intersect each other, and the input space is covered by all the regions.

Each of the partitions has a linear model to be applied to any one of two divided regions. The linear model includes a linear regression, logistic regression, Poisson regression, and logarithmic linear model, for example. Also, a prediction variable of the region is represented by a linear combination of all linear models to be applied to respective regions. The prediction variable is represented in this way, whereby a convex objective function can be generated.

The linear model is optimized by leaning a local relationship between an input vector and an output value. In other words, positions of the partitions are given at first, and a linear model to be applied to each of the partitions is determined by learning.

The region linear model optimization system 10 of the present exemplary embodiment includes a data input device 11, a partition setting unit 12, a linear model setting unit 13, a region model calculation unit 14, a model optimization unit 15, and a model output device 16, as illustrated in FIG. 1.

The data input device 11 is a device for inputting the input data 111. The data input device 11 inputs a parameter required for optimization of the model simultaneously when inputting the input data 111.

The partition setting unit 12 sets a partition in the input space. Incidentally, when the number of partitions is P, setting P partitions in the input space corresponds to identifying $2^P$ regions in the input space essentially.

Any method can be used for setting the partition. Since the number of data to be sampled is a finite number, the partition setting unit 12 may set a dividing partition for each sample, for example. However, in order to suppress increase in the amount of calculation due to increase in the number of partitions, the partition setting unit 12 may randomly set a predetermined number of partitions. In addition, the partition setting unit 12 may set a suitable partition by partially using a method used in a decision tree model, and may set a partition dividing a dimension axis at equal intervals.

In addition, the partition setting unit 12 may set a partition with a coarse granularity at first, and again set a partition with a finer granularity for a region determined as having a large error as a result of optimization described later.

The linear model setting unit 13 sets for a partition a linear model to be applied to one of subspaces (that is, regions) divided by the partition, the partition being set by the partition setting unit 12.

Hereinafter, a linear model to be set for the p-th partition is described as $a_p$. In addition, an activeness function representing whether or not $a_p$ is used for predicting data x is described as $f_p(x)$, and it is defined that $a_p$ is used for predicting the data x when $f_p(x)=1$. Here, $f_p(x)$ satisfies a condition of Expression 1 shown below.

$$f_p(x) \in \{0,1\} \quad \text{(Expression 1)}$$

Figure 2:
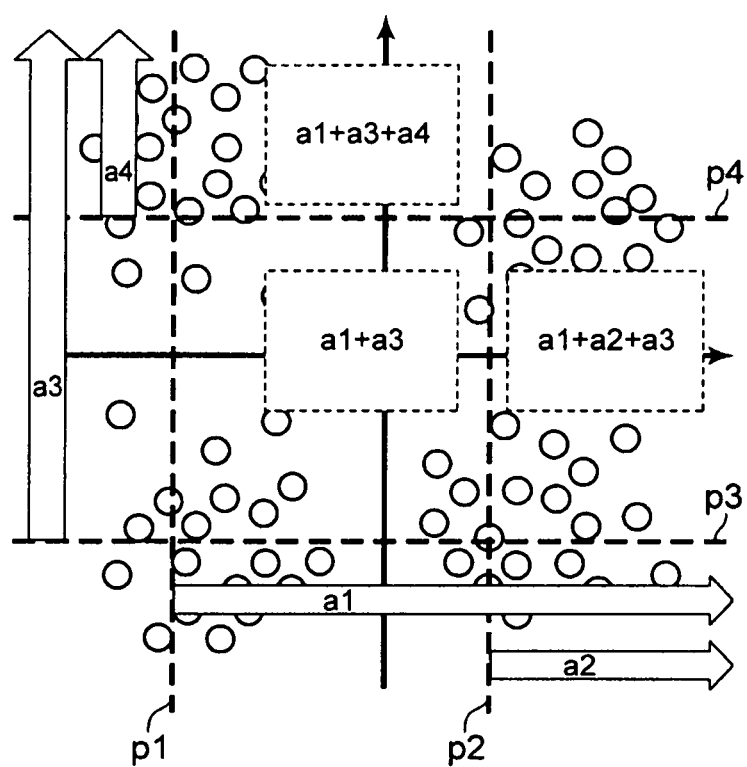
FIG. 2 It depicts an explanatory diagram illustrating an example of prediction variables of each region.

FIG. 2 is an explanatory diagram illustrating an example of prediction variables of each region. In the example illustrated in FIG. 2, it is illustrated that the linear model setting unit 13 sets for a partition $p_1$ a linear model $a_1$ to be applied to the right side of the partition $p_1$. For example, when the data x exists in the right side of the partition $p_1$, a corresponding activeness function satisfies $f_1(x)=1$, in the example illustrated in FIG. 2. That is, the activeness function corresponds to an indicator function to be associated with the partition, and represents that the linear model is applied to one of the regions.

The region model calculation unit 14 represents the prediction variable (linear model) of each region in the region linear model as a linear combination of the linear models to be applied to the respective regions. The linear model is set for each of the partitions dividing the region. That is, the linear model is set for each of the partitions by the linear model setting unit 13, whereby the prediction variable of each region can be represented as a linear combination of all linear models to be applied to the respective regions.

For example, in the example illustrated in FIG. 2, the prediction variable of the region in the right side of the partition $p_1$ and the right side of the partition $p_3$ can be represented by a linear combination $(a_1+a_3)$ of linear models $a_1$ and $a_3$ (see the dotted rectangle in FIG. 2). Since the prediction variable of each region is represented by the linear combination of all linear models to be applied to the respective regions, as a result the prediction variable is represented by a linear model.

Here, the present linear models are defined as follows. Given P activeness functions $f_1, \ldots, f_P$ are represented in vector form as Expression 2 shown below.

[Mathematical Expression 1]

$$f(\cdot) = (f_1(\cdot), \ldots, f_p(\cdot), \ldots, f_P(\cdot))^T \quad \text{(Expression 2)}$$

In Expression 2, the p-th element $f_p(x)$ (here, $f_p(x) \in \{0, 1\}$) shows whether or not a linear model $a_p$ is applied to the data x. An activeness function $f(\cdot)$ represents at most $2^P$ regions, and $f(x)$ shows a region to which the data x belongs. When the linear model is defined in this way, the prediction variables of the individual regions are represented as Expression 3 shown below.

[Mathematical expression 2]

$$\sum_{p=1}^{P} f_p(\cdot) a_p \quad \text{(Expression 3)}$$

The model optimization unit 15 optimizes the region linear model. Here, a weight matrix A is defined as Expression 4 shown below. In Expression 4, D represents the number of dimensions of a dimension d.

[Mathematical expression 3]

$$A = (a_1, a_2, \ldots, a_P) = \begin{pmatrix} a_{11} & \cdots & a_{1P} \\ \vdots & a_{dp} & \vdots \\ a_{D1} & \cdots & a_{DP} \end{pmatrix} \quad \text{(Expression 4)}$$

At this time, a prediction function g(•) can be defined as Expression 5 shown below. That is, the present linear models are represented as Expression 5 shown below.

[Mathematical expression 4]

$$g(x) = \sum_p f_p(x) \sum_d a_{dp} x_d \quad \text{(Expression 5)}$$

In addition, Expression 5 shown above can be modified as Expression 6 shown below. That is, it is shown that the present linear models behave as linear models relating to the weight matrix A. In addition, according to Expression 6 shown below, it can be said that a prediction function g(x) is a linear predictor for each data point x, and a local linear predictor as a whole.

[Mathematical expression 5]

$$g(x) = (Af(x))^T x = \sum_p f_p(x) a_p^T x = \sum_p f_p(x) \sum_d a_{dp} x_d \quad \text{(Expression 6)}$$

Meanwhile, since the individual regions use different linear models, the present linear models show non-linearity as a whole. Such non-linearity is caused by the activeness function $f_p$, and the activeness function is an essentially important component in the present linear models.

The model optimization unit 15 represents an objective function of the present invention as a convex optimization problem shown in Expression 7 below, by introducing a convex loss function l(•, •). The convex loss function includes squared loss in regression, squared hinge loss in classification, or logistic loss, for example.

[Mathematical expression 6]

$$\min_A \sum_n l\left(y_n, \sum_p f_p(x_n) \sum_d a_{dp} x_{nd}\right) \quad \text{(Expression 7)}$$

In this way, an optimization problem of the present linear models comes down to the convex optimization problem as shown in Expression 7. The model optimization unit 15 optimizes the weight matrix A (that is, the linear model set for each of the partitions) by solving the convex optimization problem shown in Expression 7, and as a result optimizes the region linear model.

By representing the present linear models as described above, the model optimization unit 15 optimizes the region linear model having convexity. For that reason, a non-convex problem in which there is difficulty in optimization can be avoided, and an optimal region linear model can be generated.

The model output device 16 outputs the region linear model optimized.

The partition setting unit 12, the linear model setting unit 13, the region model calculation unit 14, and the model optimization unit 15 are realized by a CPU of a computer that operates in accordance with a program (region linear model optimization program).

For example, the program is stored in a storage unit (not illustrated) of the region linear model optimization system 10, and the CPU may read the program and operate as the partition setting unit 12, the linear model setting unit 13, the region model calculation unit 14, and the model optimization unit 15, in accordance with the program.

In addition, each of the partition setting unit 12, the linear model setting unit 13, the region model calculation unit 14, and the model optimization unit 15 may be realized by dedicated hardware. In addition, the region linear model optimization system according to the present invention may be configured by two or more physically separated devices connected to each other by wired or wireless connection.

Figure 3:
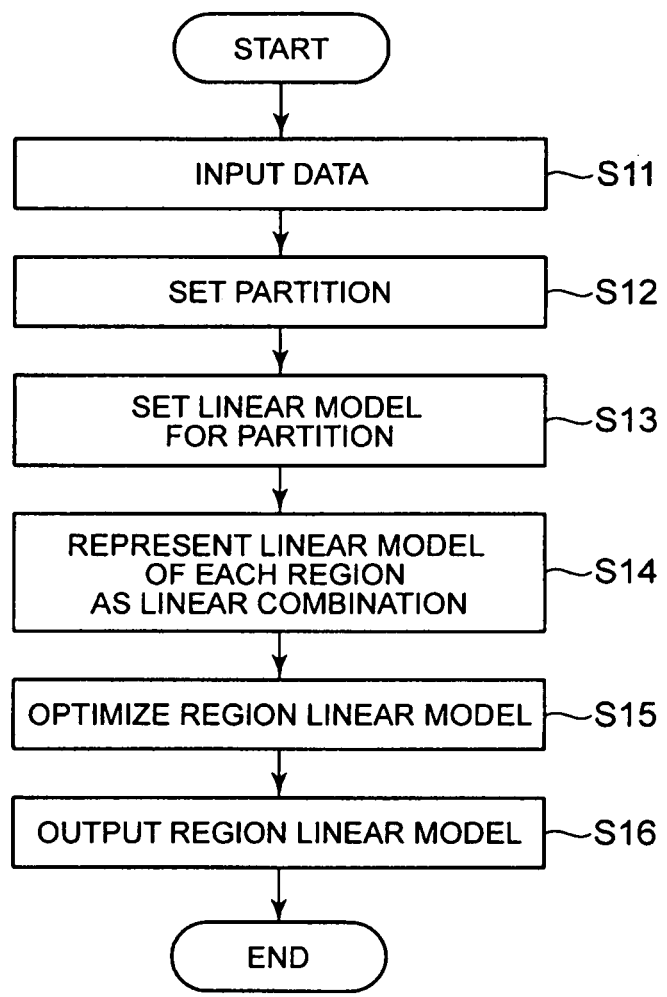
FIG. 3 It depicts a flowchart illustrating an operation example of the region linear model optimization system of the first exemplary embodiment.

Next, operation of the region linear model optimization system of the present exemplary embodiment will be described with reference to a specific example. FIG. 3 is a flowchart illustrating an operation example of the region linear model optimization system of the present exemplary embodiment. In addition, FIG. 4 to FIG. 7 are explanatory diagrams each illustrating a relationship between the linear model and the partition set in the input space.

Figure 4:
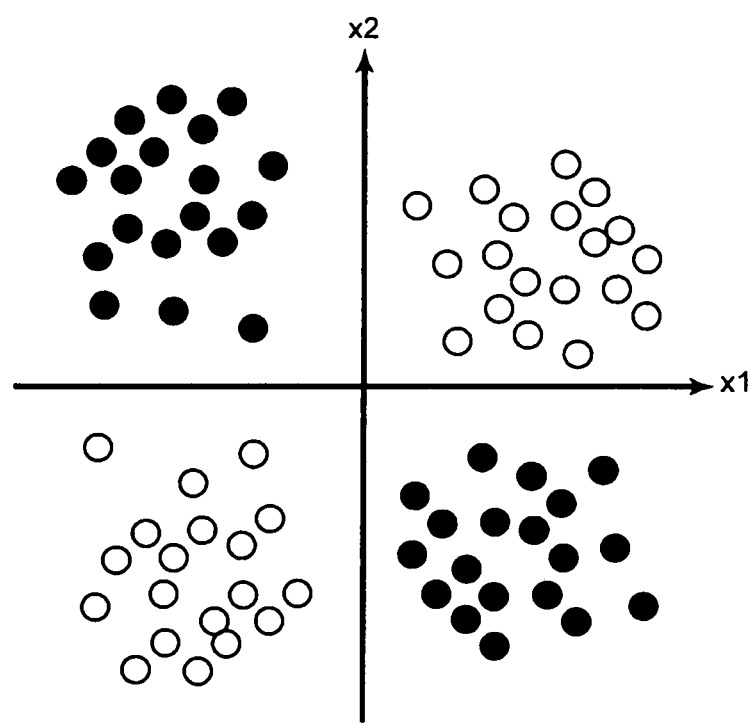
FIG. 4 It depicts an explanatory diagram illustrating a relationship between a partition and a linear model.

First, the data input device 11 inputs the input data 111 (step S11). Here, as illustrated in FIG. 4, it is assumed that the input data 111 illustrated in two dimensions are input. In FIG. 4, black circles and with the circles represent individual samples (data), and it is assumed that samples illustrated by black circles, and samples illustrated by white circles are each data having a common property.

The partition setting unit 12 sets the partition (step S12). Here, as illustrated in FIG. 5, it is assumed that three partitions ($p_1$-$p_3$) orthogonal to the $x_1$ axis direction, and three partitions ($p_4$-$p_6$) orthogonal to $x_2$ axis direction are set as partitions, respectively.

Figure 5:
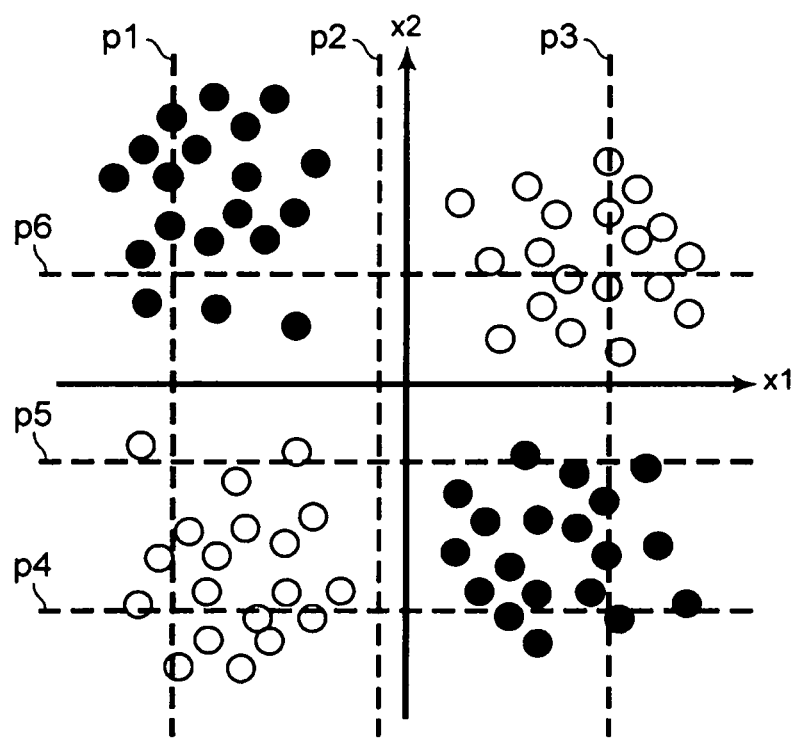
FIG. 5 It depicts an explanatory diagram illustrating the relationship between the partition and the linear model.

Incidentally, in the example illustrated in FIG. 5, the partition setting unit 12 sets the partitions orthogonal to the dimension axes of the input space; however, the set partitions are not limited to those orthogonal to the dimension axes. The partition setting unit 12 may set partitions of concentric circular shapes or concentric elliptical shapes, partitions oblique to the axes, and partitions represented by two or more separated circles or ellipses, for example.

Figure 6:
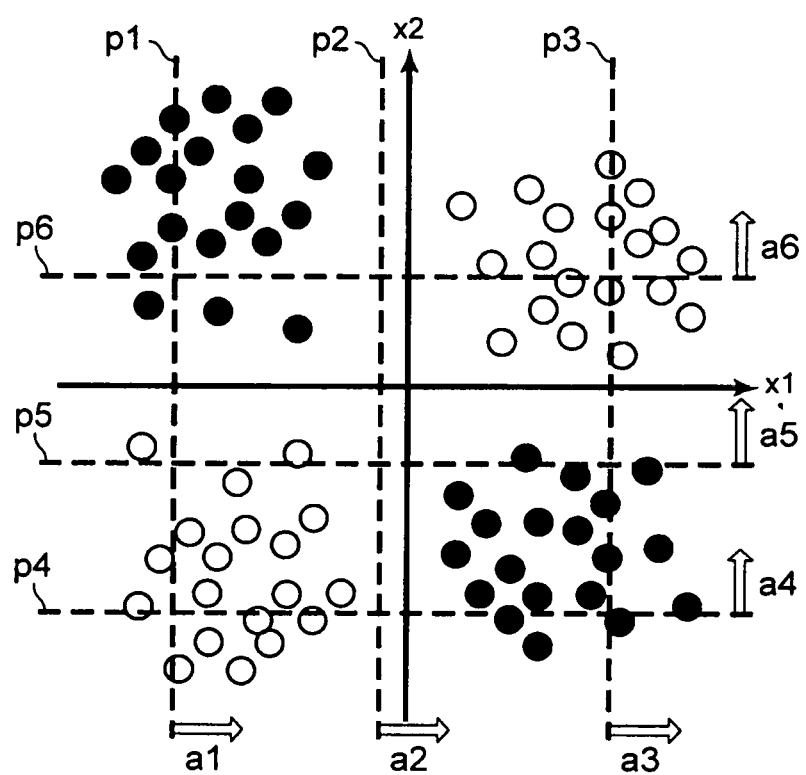
FIG. 6 It depicts an explanatory diagram illustrating the relationship between the partition and the linear model.

Next, the linear model setting unit 13 sets the linear model for the partition set by the partition setting unit 12 (step S13). Here, as illustrated in FIG. 6, linear models $a_1$-$a_6$ to be applied to respective regions in the right side of the partitions are set for partitions $p_1$-$p_6$, respectively. In addition, the linear model setting unit 13 also defines activeness functions $f_1$-$f_6$ for representing that the linear models are each applied to one of the regions (here, region in the right side) divided by the corresponding partition.

Incidentally, when the partition setting unit 12 sets the partitions of concentric circular (concentric elliptical) shapes, the linear model setting unit 13 may set linear models each to be applied to one of the regions of the inside or outside of the concentric circle (concentric ellipse), for example. In addition, when the partition setting unit 12 sets the partitions oblique to the dimension axes, the linear model setting unit 13 may set linear models each to be applied to a region in the increasing direction of an arbitrarily defined dimension axis, for example. In addition, when the partition setting unit 12 sets the partitions represented by two or more separated circles (ellipses), the linear model setting unit 13 may set linear models each to be applied to one of the regions of the inside or outside of the circles (ellipses), for example.

Figure 7:
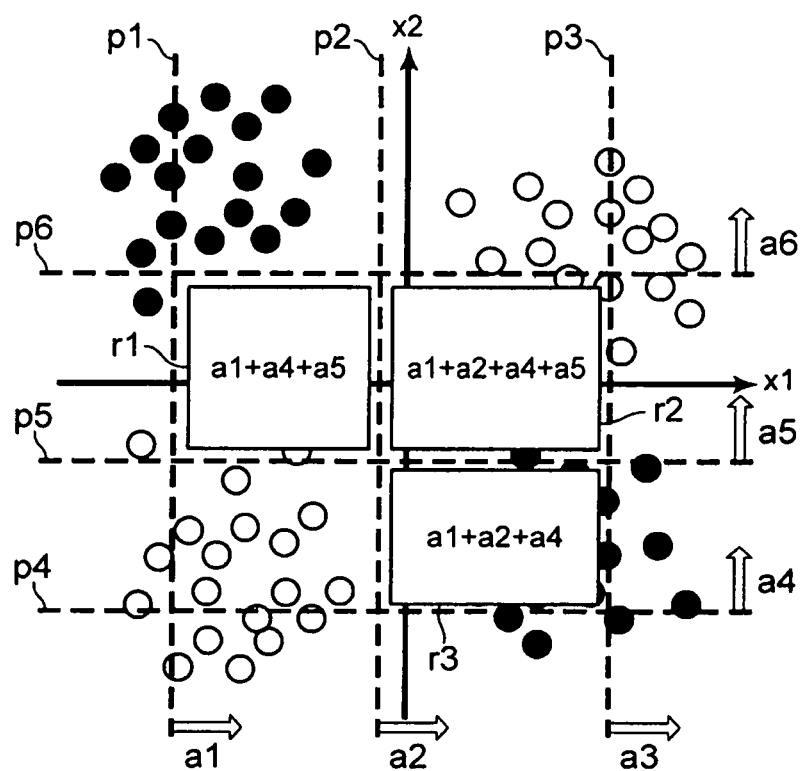
FIG. 7 It depicts an explanatory diagram illustrating the relationship between the partition and the linear model.

The region model calculation unit 14 represents the linear model of each region divided by the corresponding partition as a linear combination of the linear models to be applied to the respective regions (step S14). For example, a region $r_1$ illustrated in FIG. 7 is a region in the right side of the partition $p_1$, the partition $p_4$, and the partition $p_5$. Therefore, the region model calculation unit 14 represents the linear model of the region $r_1$ by $a_1+a_4+a_5$ that is a linear combination of the linear model $a_1$ the linear model $a_4$, and the linear model as set for the respective partitions. The same applies to a region $r_2$, and a region $r_3$.

The model optimization unit 15 optimizes the region linear model, based on the linear model of each region represented by the region model calculation unit 14 (step S15). The model optimization unit 15 optimizes the region linear model by optimizing the convex loss function represented by Expression 7 above, for example.

The model output device 16 outputs the region linear model optimized (step S16).

As described above, according to the present exemplary embodiment, the linear model setting unit 13 sets for the indicator function (partition) the linear model to be applied to one of the regions (subspaces) divided by the partition, the indicator function dividing the input space including data into two portions. Also, the region model calculation unit 14 represents a model of each of the regions in the region linear model as a linear combination of the linear models to be applied to the respective regions.

The model of each region is represented in this way, so that the targeted region linear model has convexity. For that reason, according to the present exemplary embodiment, the model optimization unit 15 optimizes the region linear model, based on the linear model of each region represented by the region model calculation unit 14, so that the non-convex problem can be avoided and the optimal region linear model can be generated.

For example, in a general region linear model, a position of the partition and the linear model set for the region divided by the partition are simultaneously optimized. For that reason, the optimization problem of the region linear model becomes a non-convex problem, and optimization is difficult.

In addition, for example, in a general decision tree model, the partition is set at a position at which it is determined that the input space can be appropriately divided, and processing is repeated that further divides the divided input space. However, for example, when the input space as illustrated in FIG. 4 is given at first, it is difficult to appropriately divide the input space regardless of the position at which the partition is set, in the general decision tree model.

On the other hand, in the present linear models, the linear model is set for the partition set in advance, and the region linear model is represented by a positional relationship between the partitions. The region linear model is represented in this way, and the optimization problem of the region linear model can be solved by a convex optimization problem, so that cancellation of initial value dependency and convergence to a global optimal solution become possible.

Second Exemplary Embodiment

In the first exemplary embodiment, a method has been described in which the model optimization unit 15 optimizes the linear model to be set for the partition. In the present exemplary embodiment, a method will be described for optimizing the region by selecting effective partitions among set partition candidates, in addition to the method in the first exemplary embodiment.

Figure 8:
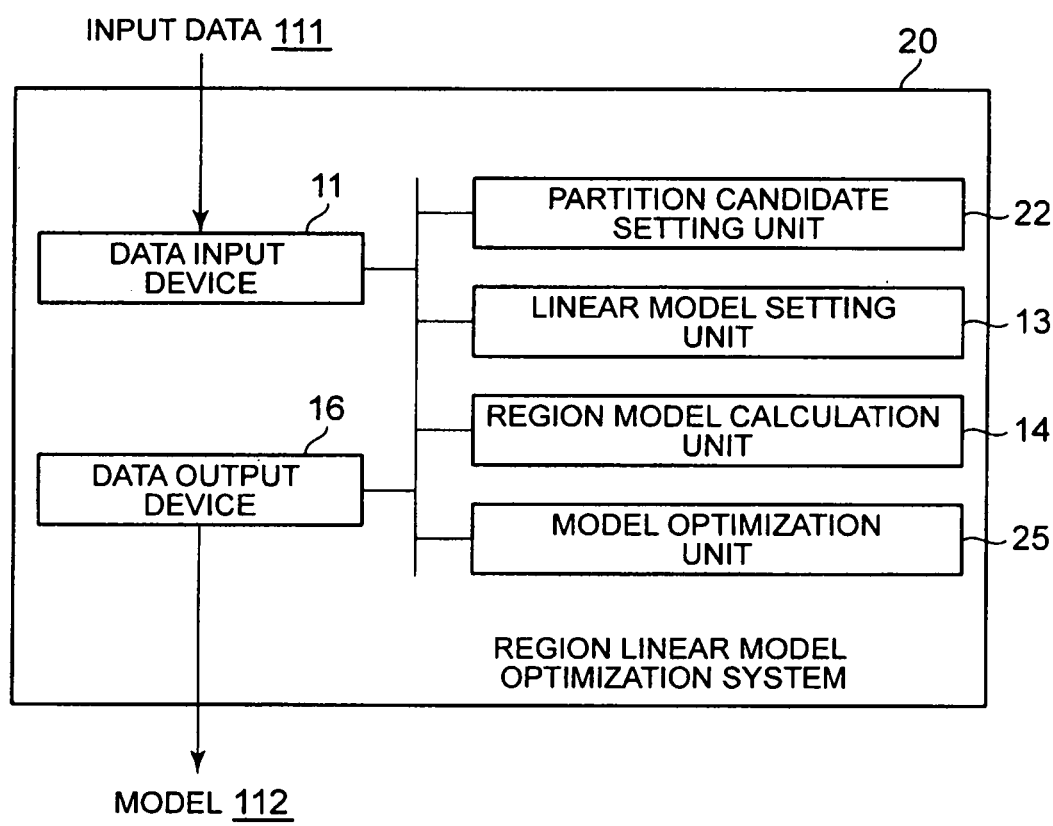
FIG. 8 It depicts a block diagram illustrating a configuration example of a second exemplary embodiment of the region linear model optimization system according to the present invention.

FIG. 8 is a block diagram illustrating a configuration example of a second exemplary embodiment of the region linear model optimization system according to the present invention. A region linear model optimization system 20 of the present exemplary embodiment includes a data input device 11, a partition candidate setting unit 22, a linear model setting unit 13, a region model calculation unit 14, a model optimization unit 25, and a model output device 16. Details of the data input device 11, the linear model setting unit 13, the region model calculation unit 14, and the model output device 16 are similar to those in the first exemplary embodiment.

The partition candidate setting unit 22 sets partition candidates. Incidentally, a method for setting the partition candidates is similar to the method for setting the partition by the partition setting unit 12 of the first exemplary embodiment.

The model optimization unit 25 optimizes the region linear model by performing optimization of the partition candidates to be selected and optimization of the linear model set for the partition.

In the present exemplary embodiment, in order to select an optimal partition among the partition candidates, a regularization term $\Omega(g(\bullet))$ is used for evaluating appropriateness of a structure of a prediction function. The model optimization unit 25 performs optimization of the region linear model by obtaining the prediction function $g(\bullet)$ that minimizes the sum of the loss function and the regularization term.

Specifically, the model optimization unit 25 optimizes the region linear model, based on the sum of the loss function $l(\bullet, \bullet)$ for evaluating the region linear model and the regularization term $\Omega(g(\bullet))$ for making a partition structure sparse. Making a partition structure sparse includes meanings of both selecting an appropriate partition among the partition candidates, and making the region divided by the partition sparse.

The expression for obtaining the prediction function $g(\bullet)$ that minimizes the sum of the loss function and the regularization term can be defined as Expression 8 shown below.

[Mathematical expression 7]

$$\min_A \sum_n l(y_n, g(x_n)) + \Omega(g(\cdot)) \qquad \text{(Expression 8)}$$

Here, for the regularization term $\Omega(g(\cdot))$, any regularization term can be used as far as it has an effect of making the region linear model sparse. The regularization term to be used is determined by the user or the like depending on the partition structure to be optimized. The model optimization unit 25 may perform optimization of the region linear model by calculating Expression 9 shown below, for example.

[Mathematical expression 8]

$$\min_A \sum_n l(y_n, g(x_n)) + \Omega(A) \quad \text{(Expression 9)}$$

$$\text{where } \Omega(A) = \lambda_P \sum_{p=1}^{P} \|a_p\|_\infty + \lambda_0 \sum_{p=0}^{P} \sum_{d=1}^{D} \|a_{dp}\|_\infty$$

In Expression 9, $\Omega(A)$ is the regularization term, and $\lambda_p$, $\lambda_0$ each represent a weight value of regularization. In addition, the right side representing a condition of $\Omega(A)$ represents group regularization. As for the right side that is the condition of $\Omega(A)$, the first term is a term for decreasing the number of partitions, and the second term is a term for making the final linear model sparse.

Since infinity norm has convexity, the optimization problem of Expression 9 represented by the sum of the loss function and the regularization term having convexity also comes down to a convex optimization problem. In this way, the regularization term having convexity is used to optimize selection of the partition candidates, whereby initial value dependency can be canceled and the optimal region linear model can be generated.

Incidentally, in the above description, the infinity norm is used for the regularization term; however, the structure to be used for the regularization term is not limited to the infinity norm. For example, for the purpose of representing the final model with less feature values, L1 regularization may be used for the regularization term in order to increase interpretability of the partition.

Besides, for the purpose of giving similar weight, Group Fused Lasso may be used for the regularization term in order to detect a similar partition, and Elastic Net may be used for the regularization term in order to detect all effective partitions. Since L1 regularization, Group Fused Lasso, and Elastic Net all have convexity, a similar effect as described above can be obtained.

Incidentally, in the above description, a case has been exemplified in which the regularization term having convexity is used; however, the structure to be used for the regularization term does not have to have convexity. For example, L0 regularization having non-convexity, a group L0, or the like may be used for the regularization term. Even in such a case, when the loss function 1 has smooth convexity, it is possible to apply an efficient solution by a greedy search algorithm, such as an orthogonal matching pursuit method, or a forward backward greedy method.

In this way, the reason why any regularization term can be used is due to the fact that the minimization problem of the loss function for evaluating prediction performance is a convex optimization problem. Since a general region linear model has non-convexity, the efficient solution in a case of including any regularization term is not known in general, and it is hard to say that interpretability of the model is facilitated. On the other hand, in the present exemplary embodiment, since the problem optimizing the region linear model is a convex optimization problem, it is possible to incorporate regularization terms of various structures while maintaining interpretability of the region linear model.

Incidentally, the partition candidate setting unit 22, the linear model setting unit 13, the region model calculation unit 14, and the model optimization unit 25 are realized by a CPU of a computer that operates in accordance with a program (region linear model optimization program).

Next, operation of the region linear model optimization system of the present exemplary embodiment will be described with reference to a specific example. Incidentally, operation of the region linear model optimization system 20 of the present exemplary embodiment is similar to that of the region linear model optimization system 10 of the first exemplary embodiment. However, the operation is different from that of the first exemplary embodiment in that the model optimization unit 25 performs also optimization of the regularization term, in the present exemplary embodiment.

The model optimization unit 25 optimizes the region linear model, based on the linear model of each region represented by the region model calculation unit 14. Specifically, the model optimization unit 25 of the present exemplary embodiment optimizes the region linear model, based on the sum of the loss function and the regularization term.

For example, it is assumed that the linear model of each region is represented with the contents illustrated in FIG. 7 by the region model calculation unit 14. Here, when $a_1$ to be applied to each region is all zero as a result of optimization, it means that $a_1$ has not been used. Hence, when the linear model $a_1$ is zero, it is represented that the partition $p_1$ is also unnecessary. Since the relationship between regions also becomes sparse by excluding unnecessary partitions, the region linear model with higher interpretability can be represented.

Figure 9:
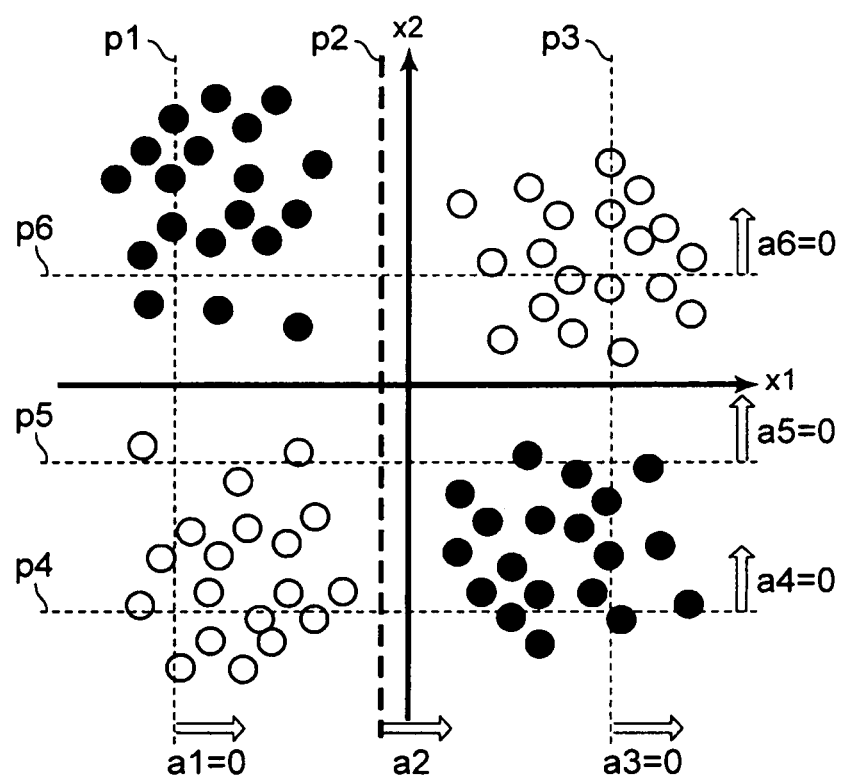
FIG. 9 It depicts an explanatory diagram illustrating an example of a result of selecting a partition.

FIG. 9 is an explanatory diagram illustrating an example of a result of selecting the appropriate partition from the partition candidates. In the example illustrated in FIG. 9, it is represented that all linear models other than linear model $a_2$ are all zero, as a result of optimization. In this case, the partitions other than the partition $p_2$ are excluded.

As described above, according to the present exemplary embodiment, the model optimization unit 25 optimizes the region linear model, based on the sum of the loss function and the regularization term for making a partition structure sparse. Accordingly, interpretability of the model can be improved since the appropriate partition can be selected, in addition to the effect of the first exemplary embodiment.

Next, a modification of the present exemplary embodiment will be described. In the present modification, a case will be described in which the linear model $a_0$ effective for all data is introduced in order to avoid occurrence of data to which the linear model is not applied and that cannot be predicted, as a result of optimizing the partition.

The linear model setting unit 13 of the present exemplary embodiment sets linear models for the partition candidates set by the partition candidate setting unit 22, and sets a linear model to be applied to all regions for a partition to be associated with all the regions in the input space.

Figure 10:
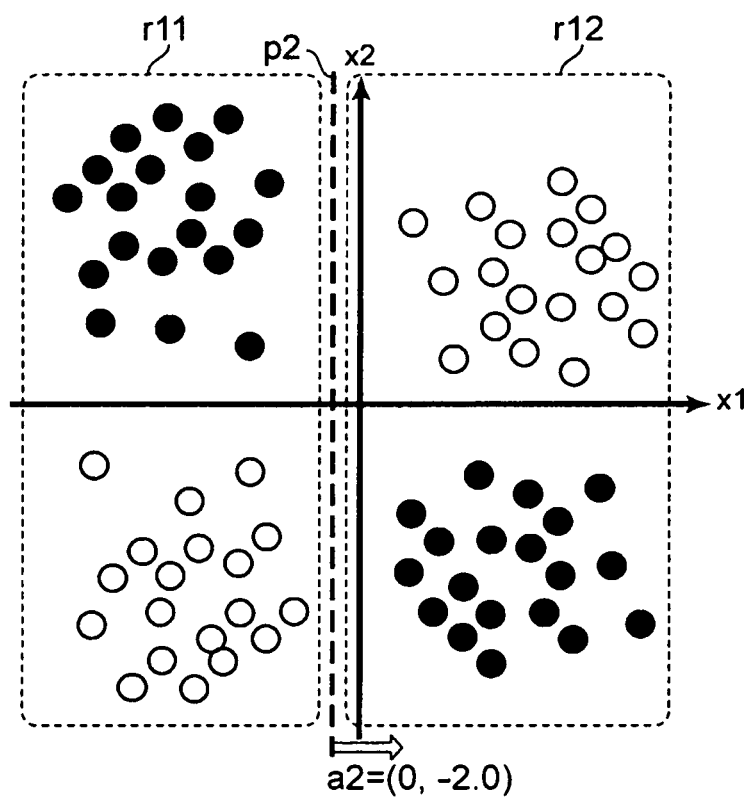
FIG. 10 It depicts an explanatory diagram illustrating an example of dividing an input region.

FIG. 10 is an explanatory diagram illustrating an example of dividing an input region. In the example illustrated in FIG. 10, the linear model $a_2$ is applied to a region $r_{12}$ in the right side of the partition $p_2$. On the other hand, the partition to which the linear model is applied does not exist in a region $r_{11}$ in the left side of the partition $p_2$. Hence, in this state, data of the region $r_{11}$ in the left side of the partition $p_2$ cannot be predicted.

Figure 11:
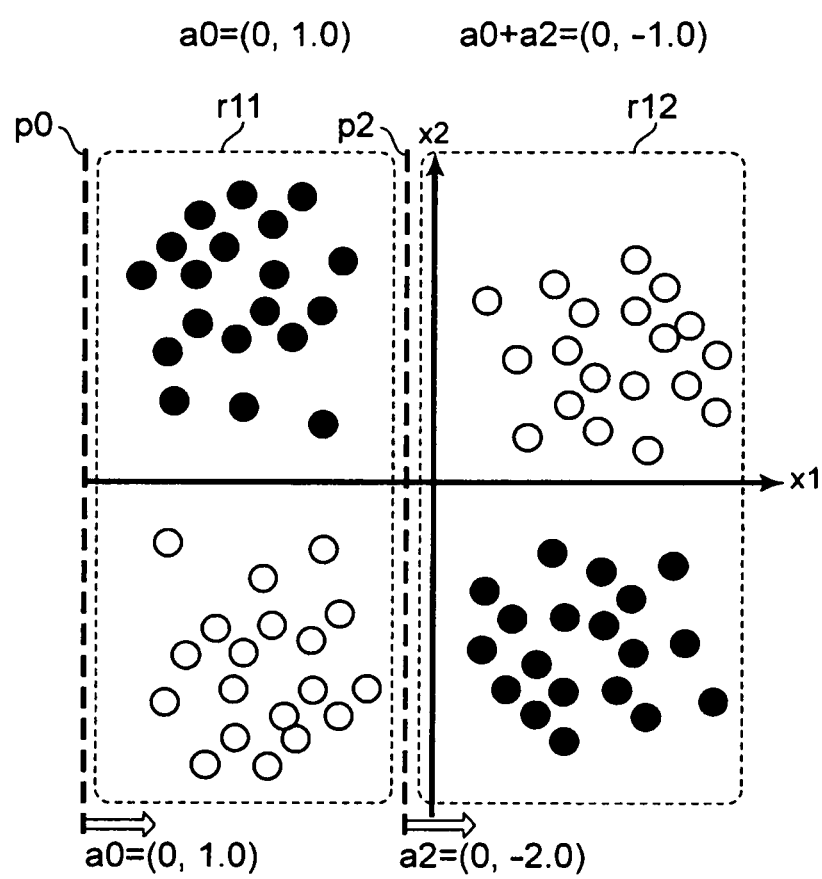
FIG. 11 It depicts an explanatory diagram illustrating that a linear model to be applied to all data is set.

Therefore, in the present modification, the linear model $a_0$ effective for all data is introduced. FIG. 11 is an explanatory diagram illustrating that the linear model $a_0$ to be applied to all data is set, for a partition $p_0$ associated with all regions of the input space. Incidentally, it can be said that the linear model $a_0$ is a fully-applied linear model since it is a linear model to be applied to all regions.

As a result of introducing the linear model $a_0$ to be applied to all data, the region model calculation unit 14 calculates the linear model of the region $r_{11}$ in the left side of the partition $p_2$ as $a_0$, and calculates the linear model of the region $r_{12}$ in the right side of the partition $p_2$ as $a_0+a_2$. For example, it is assumed that the linear model $a_0=(0, 1.0)$ is introduced when the linear model $a_2=(0, -2.0)$ is set. In this case, the region model calculation unit 14 calculates the linear model of the region $r_{12}$ in the right side of the partition $p_2$ as $a_0+a_2=(0, -1.0)$, for example.

Local model change can be grasped in details by introducing such a linear model $a_0$. Specifically, a prediction model common to all data can be learned by using the linear model $a_0$, and properties unique to some data can be learned by using the partition (specifically, the linear model set for each of the partitions).

The model optimization unit 25 optimizes the region linear model while maintaining effectiveness of the linear model $a_0$. That is, the model optimization unit 25 optimizes the region linear model so that the linear model $a_0$ is always an effective vector.

For example, Group Lasso described above can be used for automatically selecting an effective partition. However, since the linear model $a_0$ is desired to be always the effective vector in the present modification, Group regularization is not applied to the linear model $a_0$. In addition, L0 regularization can be used in order to hold interpretability of each of the partitions.

Here, the weight matrix A including the linear model $a_0$ is defined as Expression 10 shown below. In addition, since the linear model $a_0$ is desired to be always effective, the activeness function $f(\cdot)$ is defined as Expression 11 shown below.

[Mathematical expression 9]

$$A = (a_0, a_1, a_2, \ldots, a_P) = \begin{pmatrix} a_{10} & \cdots & a_{1P} \\ \vdots & a_{dp} & \vdots \\ a_{D0} & \cdots & a_{DP} \end{pmatrix} \quad \text{(Expression 10)}$$

$$f(\cdot) = (1, f_1(\cdot), \ldots, f_p(\cdot), \ldots, f_P(\cdot))^T \quad \text{(Expression 11)}$$

At this time, the optimization problem of the region linear model can be defined as a submodular optimization problem, as Expression 12 shown below.

[Mathematical expression 10]

$$\min_A \sum_n l(y_n, g(x_n)) + \lambda^1 \sum_{p \in \{1, \ldots P\}} 1_{\{a_p \neq 0\}} + \sum_p \lambda_p^2 \|a_p\|_0 \quad \text{(Expression 12)}$$

The model optimization unit 25 optimizes the region linear model while maintaining effectiveness of the linear model $a_0$ by solving the optimization problem of Expression 12 shown above. Expression 12 shown above can be optimized by any method. The model optimization unit 25 may perform convex relaxation by Lovasz extension for the regularization term, for example. In addition, the model optimization unit 25 may use submodular optimization or Group Orthogonal Matching Pursuit (Group OMP), as a method for optimization. Besides, the model optimization unit 25 may perform optimization by using a proximity gradient method and a network flow.

In addition, the model optimization unit 25 may use Generalization Bound for optimization of the region linear model. By using Generalization Bound, the upper limit of expected loss can be obtained by using experience loss.

Here, it is assumed that data $(x_n, y_n)$ is in accordance with independently identical probability distributions sampled form a particular data distribution D. In addition, it is assumed that the loss function $l(\bullet, \bullet)$ is an L-Lipchitz function of norm $\|\bullet\|$. At this time, Expression 13 (inequality) shown below holds at least with probability 1-δ, for any constant that satisfies $\delta \in (0, 1)$, and for any weight matrix that satisfies $A \in \mathcal{A}$.

[Mathematical expression 11]

$$E_{(x,y)\sim D}[l(y, g(x))] \leq \frac{1}{N}\sum_{n=1}^N l(y_n, g(x_n)) + \frac{2^{3/2}}{\sqrt{N}}(2 + \sqrt{\ln(DP+P+D)}) + \sqrt{\frac{9\ln 2/\delta}{2N}} \quad \text{(Expression 13)}$$

In Expression 13, A is a weight set that satisfies $_{group}(A) \leq 1$, and $\Omega_{group}(A)$ is defined in section 2.5 of the following reference literature. Since a difference between the expected loss and the experience loss converges to zero in accordance with increase of the number of data when $P=o(\exp(N))$, it is sufficient that the value off the experience loss is minimized.

REFERENCE LITERATURE

Andreas Maurer and Massimiliano Pontil, "Structured sparsity and generalization.", Journal of Machine Learning Research 13, pp. 671-690, 2012.

As described above, according to the present modification, the linear model setting unit 13 sets the linear model $a_0$ for the partition $p_0$, and the model optimization unit 25 optimizes the region linear model while maintaining effectiveness of the linear model $a_0$, based on the sum of the loss function and the regularization term. For that reason, local model change can be grasped in details, in addition to the effect of the above exemplary embodiment.

Figure 12:
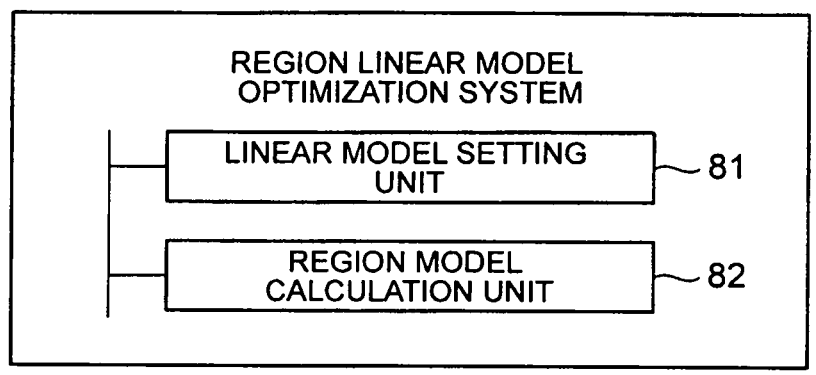
FIG. 12 It depicts a block diagram illustrating an outline of the region linear model optimization system according to the present invention.

Next, an outline of the present invention will be described. FIG. 12 is a block diagram illustrating an outline of the region linear model optimization system according to the present invention. The region linear model optimization system according to the present invention is a region linear model optimization system for optimizing a region linear model (for example, the region linear model optimization system 10, the region linear model optimization system 20), and includes: a linear model setting unit 81 (for example, the linear model setting unit 13) which sets a partition a linear model (for example, linear regression, logistic regression, or Poisson regression) to be applied to one of regions representing subspaces divided by the partition, the partition being an indicator function dividing an input space (for example, a space in which the input data 111 exists) into two portions; and a region model calculation unit 82 (for example, the region model calculation unit 14) which represents a model of each of the regions in the region linear model as a linear combination of the linear models to be applied to the respective regions.

With such a configuration, the non-convex problem can be avoided and the optimal region linear model can be generated. Specifically, since the linear region models represented by the present linear models have convexity, the optimization problem of the region linear model comes down to a convex optimization problem. For that reason, cancellation of initial value dependency and convergence to a global optimal solution become possible by using the present linear models.

In addition, the region linear model optimization system may include a model optimization unit (for example, the model optimization unit 25) for optimizing the region linear model (by using Expression 8 shown above, for example), based on a sum of a loss function (for example, $g(\cdot)$) for evaluating the region linear model and a regularization term (for example, $\Omega(g(\cdot))$) for making a partition structure sparse.

According to such a configuration, the number of partitions to be set can be appropriately suppressed, so that interpretability of the model can be improved.

In addition, the linear model setting unit 81 may set a fully-applied linear model (for example, the linear model $a_0$ that is a linear model to be applied to all regions of the input space, for the partition (for example, partition $p_0$) representing all the regions. Also, the model optimization unit may optimize the region linear model while maintaining effectiveness of the fully-applied linear model (by using Expression 12 shown above, for example), based on the sum of the loss function and the regularization term.

According to such a configuration, local model change can be grasped in details.

In addition, the model optimization unit may optimize the region linear model, based on a sum of the loss function and a regularization term having convexity. According to such a configuration, the optimization problem of the sum of the loss function and the regularization term also comes down to a convex optimization problem, so that cancellation of initial value dependency and convergence to a global optimal solution become possible.

In addition, the region linear model optimization system may include a partition setting unit (for example, the partition setting unit 12) for setting in an input space at least one of a partition orthogonal to a dimension axis of the input space, a partition in an oblique direction to the dimension axis, a partition of a concentric circular shape or a concentric elliptical shape, and partitions of two or more separated circles or ellipses. Also, the linear model setting unit 81 may set the linear model to be applied to the partition set by the partition setting unit. According to such a configuration, a partition of any shape can be used.

Figure 13:
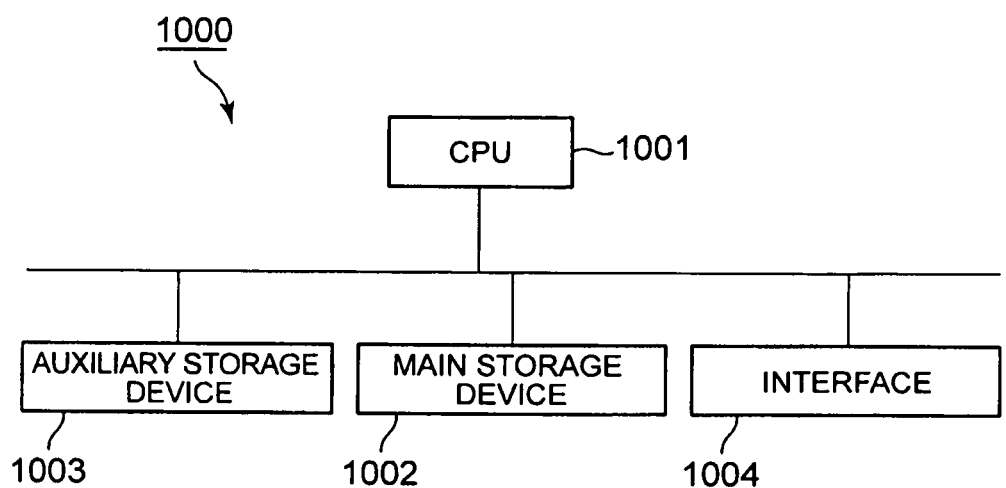
FIG. 13 It depicts a schematic block diagram illustrating a configuration of a computer.

FIG. 13 is a schematic block diagram illustrating a configuration of a computer according to at least one exemplary embodiment. A computer 1000 includes a CPU 1001, a main storage device 1002, an auxiliary storage device 1003, and an interface 1004.

The region linear model optimization systems described above are each implemented in the computer 1000. Incidentally, operation of each processing unit described above is stored in a form of a program (region linear model optimization program) in the auxiliary storage device 1003. The CPU 1001 reads the program from the auxiliary storage device 1003, deploys the program on the main storage device 1002, and then executes the processing described above in accordance with the program.

Incidentally, in at least one exemplary embodiment, the auxiliary storage device 1003 is an example of a non-transitory tangible medium. Other examples of the non-transitory tangible medium include a semiconductor memory, DVD-ROM, CD-ROM, a magneto-optical disk, and a magnetic disk connected via the interface 1004. In addition, when the program is delivered to the computer 1000 through a communication line, the computer 1000 receiving the delivery may deploy the program on the main storage device 1002 and execute the processing described above.

In addition, the program may be the one for partially realizing the function described above. Further, the program may be the one that realizes the function described above by a combination with another program already stored in the auxiliary storage device 1003, a so-called difference file (difference program).

In the above, the present invention has been described with reference to exemplary embodiments and examples; however, the present invention is not limited to the exemplary embodiments and examples described above. Various modifications that can be understood by those skilled in the art within the scope of the present invention can be made to the configuration and details of the present invention.

This application claims priority based on U.S. provisional application No. 62/069,381 filed on Oct. 28, 2014, the disclosure of which is incorporated herein in its entirety.

INDUSTRIAL APPLICABILITY

The present invention is suitably applied to a region linear model optimization system for optimizing a region linear model by machine learning, for example.

REFERENCE SIGNS LIST 10, 20 Region linear model optimization system
11 Data input device
12 Partition setting unit
13 Linear model setting unit
14 Region model calculation unit
15, 25 Model optimization unit
22 Partition candidate setting unit
$p_0$ to $p_6$ Partition
$r_1$ to $r_3$, $r_{11}$, $r_{12}$ Region

The invention claimed is:

1. A region linear model optimization system for optimizing a region linear model,
the region linear model optimization system comprising:
a hardware including a processor;
a linear model setting unit, implemented by the processor, which sets for a partition a linear model to be applied to one of regions representing subspaces divided by the partition, the partition being an indicator function dividing an input space into two portions;
a region model calculation unit, implemented by the processor, which represents a model of each of the regions in the region linear model as a linear combination of linear models to be applied to the respective regions; and
a partition setting unit, implemented by the processor, which sets in the input space at least one of a partition orthogonal to a dimension axis of the input space, a partition in an oblique direction to the dimension axis, a partition of a concentric circular shape or a concentric elliptical shape, and partitions of two or more separated circles or ellipses, wherein the linear model setting unit sets a linear model to be applied to a partition set by the partition setting unit.

2. The region linear model optimization system according to claim 1, further comprising a model optimization unit, implemented by the processor, which optimizes the region linear model, based on a sum of a loss function for evaluating the region linear model and a regularization term for making a partition structure sparse.

3. The region linear model optimization system according to claim 2, wherein the linear model setting unit sets a fully-applied linear model that is a linear model to be applied to all regions for a partition representing all the regions in the input space, and the model optimization unit optimizes the region linear model while maintaining effectiveness of the fully-applied linear model, based on the sum of the loss function and the regularization term.

4. The region linear model optimization system according to claim 2, wherein the model optimization unit optimizes the region linear model, based on a sum of the loss function and a regularization term having convexity.

5. A region linear model optimization method for optimizing a region linear model, the region linear model optimization method comprising:

setting for a partition a linear model to be applied to one of regions representing subspaces divided by the partition, the partition being an indicator function dividing an input space into two portions;

representing a model of each of the regions in the region linear model as a linear combination of linear models to be applied to the respective regions; and setting in the input space at least one of a partition orthogonal to a dimension axis of the input space, a partition in an oblique direction to the dimension axis, a partition of a concentric circular shape or a concentric elliptical shape, and partitions of two or more separated circles or ellipses.

6. The region linear model optimization method according to claim 5, further comprising optimizing the region linear model, based on a sum of a loss function for evaluating the region linear model and a regularization term for making a partition structure sparse.

7. A non-transitory computer readable information recording medium storing a region linear model optimization program to be applied to a computer for optimizing a region linear model, when executed by a processor, the region linear model optimization program causing setting for a partition a linear model to be applied to one of regions representing subspaces divided by the partition, the partition being an indicator function dividing an input space into two portions;

representing a model of each of the regions in the region linear model as a linear combination of linear models to be applied to the respective regions; and setting in the input space at least one of a partition orthogonal to a dimension axis of the input space, a partition in an oblique direction to the dimension axis, a partition of a concentric circular shape or a concentric elliptical shape, and partitions of two or more separated circles or ellipses.

8. The non-transitory computer readable information recording medium according to claim 7, further comprising optimizing the region linear model, based on a sum of a loss function for evaluating the region linear model and a regularization term for making a partition structure sparse.

* * * * *